G. W. FOORMAN.
AUGER HANDLE.
APPLICATION FILED SEPT. 22, 1909.
945,509. Patented Jan. 4, 1910.
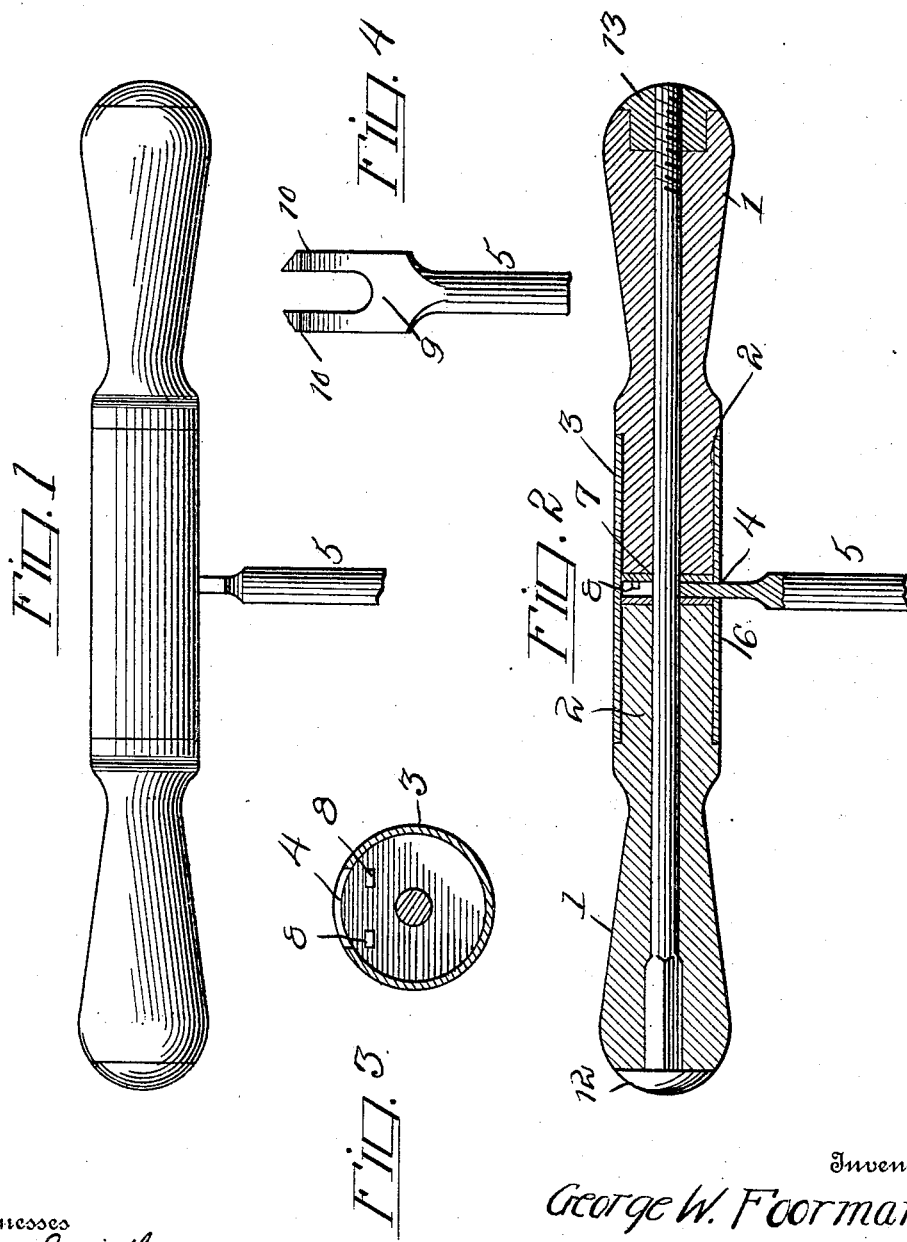
Witnesses
Wm S. Smith
J. W. Garner
Inventor
George W. Foorman
By Victor J. Evans
Attorney

UNITED STATES PATENT OFFICE.

GEORGE W. FOORMAN, OF CRESSONA, PENNSYLVANIA.

AUGER-HANDLE.

945,509.  Specification of Letters Patent.  Patented Jan. 4, 1910.

Application filed September 22, 1909. Serial No. 518,969.

*To all whom it may concern:*

Be it known that I, GEORGE W. FOORMAN, a citizen of the United States, residing at Cressona, in the county of Schuylkill and State of Pennsylvania, have invented new and useful Improvements in Auger-Handles, of which the following is a specification.

This invention is an improved auger handle and consists in the combination and arrangement of devices hereinafter described and claimed.

The object of my invention is to provide an improved auger handle which may be readily attached to and detached from the shank of an auger and which cannot become loosened or casually detached when the auger is in use.

In the accompanying drawings, Figure 1 is an elevation of an auger handle constructed in accordance with my invention. Fig. 2 is a sectional view of the same attached to the shank of an auger. Fig. 3 is a detail transverse sectional view of the same. Fig. 4 is a detail elevation of the upper or inner end of the auger shank for use in connection with my improved auger handle.

In the embodiment of my invention I provide a pair of handle members 1 which are disposed in line with each other and have cylindrical portions 2 at their inner ends. Said cylindrical portions of the handle members are fitted in a cylindrical sleeve 3 which is provided in one side with an opening 4 for the reception of the inner end of the auger shank 5. On the opposing inner ends of the handle members 1 are disks 6, 7 which in effect form portions of said handle members, and one of the said disks is provided on its outer side with ribs or studs 8. Said disks are securely attached to the handle members and are movable therewith.

The inner end of the auger shank 5 is formed with a fork 9 adapted to enter the opening 4 in the sleeve 3 so as to become disposed between the disks at the inner ends of the handle members and the arms of the said fork are provided with notches 10 of a size and shape adapted for the reception of the ribs or studs 8. The tie bolt 11 extends longitudinally through the handle members and also through openings in the disks 6, 7 and between the arms of the fork of the auger shank, the head 12 of the said tie bolt being at the outer end of one of the handle members and the other handle member having a recess in its outer end in which is countersunk a nut 13.

It will be understood that by turning the handle member provided with the nut said handle member may be moved toward or from the opposite handle member to cause the studs or ribs 8 to engage or disengage the notches in the fork arms of the auger shank so as to lock the auger shank to the handle or release it therefrom.

It will be observed by reference to the drawings that my improved auger handle presents no obstructions, is simple in construction, and it will be understood from the foregoing description that the same may be readily attached to or detached from an auger and that it is not liable to become casually disengaged from the auger when in use.

Having thus described the invention, what is claimed as new is:—

1. In combination with an implement shank having a fork at its inner end, a handle comprising a pair of handle members disposed in line with each other, a sleeve connecting said handle members and having an opening for the reception of the said fork at a point between the inner ends of said handle members, one of the latter and the said fork having co-engaging devices and a tie bolt extending through the said handle members and the said fork and connecting said handle members together.

2. In combination with an implement shank having a fork at its inner end, a handle comprising a sleeve having an opening for the reception of said fork, disks on opposite sides of said fork and in said sleeve, said fork and one of said disks having co-engaging devices to lock said fork to said disk, handle members having their inner ends in said sleeve and bearing against said disks and a tie bolt extending through and connecting said handle members together and also extending through said disks and said fork.

In testimony whereof I affix my signature in presence of two witnesses.

GEORGE W. FOORMAN.

Witnesses:
GEORGE E. COOVER,
HOWARD J. NAGLE.